United States Patent
Zuzelski et al.

(10) Patent No.: US 10,464,598 B2
(45) Date of Patent: Nov. 5, 2019

(54) OVERLOAD AND OVERSPEED DETECTION OF ELECTRIC POWER STEERING SYSTEMS

(71) Applicant: GM GLOBAL TECHNOLOGY OPERATIONS LLC, Detroit, MI (US)

(72) Inventors: John T. Zuzelski, Clarkston, MI (US); Scott R. Kloess, Rochester Hills, MI (US); Christopher J. Mielke, Shelby Township, MI (US); Bo Yu, Novi, MI (US); Nicholas V. Katcherian, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 15/652,720

(22) Filed: Jul. 18, 2017

(65) Prior Publication Data

US 2019/0023313 A1    Jan. 24, 2019

(51) Int. Cl.
*G06F 19/00*   (2018.01)
*B62D 5/04*    (2006.01)
*G07C 5/08*    (2006.01)

(52) U.S. Cl.
CPC ......... *B62D 5/0481* (2013.01); *B62D 5/0469* (2013.01); *G07C 5/0816* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,744,692 B2* | 6/2014 | Carresjo | ............. | B60C 23/0416 701/48 |
| 2004/0207257 A1* | 10/2004 | Faye | ........................ | B60T 7/12 303/125 |
| 2006/0273657 A1* | 12/2006 | Wanke | ................ | B60T 8/17555 303/146 |
| 2008/0243342 A1* | 10/2008 | Breed | ................. | B60R 21/0132 701/45 |
| 2010/0138117 A1* | 6/2010 | Witte | ........................ | B60L 7/24 701/48 |
| 2012/0130612 A1* | 5/2012 | Watanabe | ........... | B60T 8/17554 701/70 |
| 2015/0277443 A1* | 10/2015 | Beltran | .............. | G05B 19/4062 318/566 |
| 2016/0101319 A1* | 4/2016 | Tanabe | .................. | A61B 5/1118 434/255 |
| 2017/0309093 A1* | 10/2017 | Feng | ..................... | B60W 50/02 |
| 2019/0061745 A1* | 2/2019 | Hatano | ................. | B60W 30/09 |

* cited by examiner

*Primary Examiner* — Masud Ahmed
(74) *Attorney, Agent, or Firm* — Lorenz & Kopf, LLP (57) ABSTRACT

Methods and apparatus are provided for damage risk indication of a steering system of a vehicle. The apparatus includes a sensor system and a processing device. The sensor system is configured to detect a velocity of a servo unit of a steering system of the vehicle. The processing device is configured to determine an acceleration value of the servo unit and to compare the acceleration value, velocity values and thresholds of the servo unit with an acceleration value threshold, and to generate a warning signal if the acceleration value of the servo unit exceeds the acceleration value threshold. Thus, a damage risk is determined and the vehicle can be subjected to further damage investigation.

20 Claims, 3 Drawing Sheets

OVERLOAD AND OVERSPEED DETECTION OF ELECTRIC POWER STEERING SYSTEMS

TECHNICAL FIELD

The technical field generally relates to vehicles, and more particularly relates to damage risk indication, particularly to a damage risk indication system for a steering system of a vehicle, a vehicle with such a damage risk indication system, and a method for indicating a damage risk in a steering system of a vehicle.

INTRODUCTION

A steering system of a vehicle typically consists of a steering axle, a steering column, and a steering rack or gear racks (for example, a rack and pinion drive) which are arranged and configured such that a motion of a steering wheel is transferred to wheels of the vehicle. Accordingly, the wheels of the vehicle can be angularly moved within a range of travel from a left-most point to a right-most point. The left-most point and right-most point represent the left and right mechanical ends of the steering range of the steering system.

Certain impact loads in combination with specific rack positions may create mechanical overloads within the steering system of a vehicle. As a result, the mechanical overloads may cause damage to the steering system and may require repair work or even a substitution of single parts of the steering system. The consequences and the intensity of an impact are most of the times not foreseeable, i.e., it may be difficult to make a conclusion about the extent of a damage based on a force impact to the wheels, for example.

Accordingly, it is desirable to detect overload and overspeed events that may cause mechanical damage to the steering system of a vehicle. In addition, it is desirable to provide an algorithm to diagnose potential damage to the components of the steering system, such as steering rack, gears and steering columns, and indicate a potential damage. Furthermore, other desirable features and characteristics of the present invention will become apparent from the subsequent detailed description and the appended claims, taken in conjunction with the accompanying drawings and the foregoing technical field and background.

SUMMARY

A damage risk indication system for a steering system of a vehicle is provided. The damage risk indication system comprises a sensor system and a processing device. The sensor system is configured to detect a velocity of a servo unit of a steering system, and the processing device is configured to determine an acceleration value of the servo unit and to compare the acceleration value of the servo unit with an acceleration value threshold. The processing device is configured to generate a warning signal if the acceleration value of the servo unit exceeds the acceleration value threshold. Thus, a damage risk is determined and the vehicle can be subjected to further damage investigation.

In various embodiments, the processing device of the damage risk indication system is configured to repeatedly detect the velocity of the servo unit.

In various embodiments, the processing device comprises a timer which is configured to provide a time value. The processing device is configured to read out a first time value of the timer if the acceleration value of the servo unit exceeds the acceleration value threshold. The processing device is configured to read out a second time value from the timer if the acceleration value of the servo unit falls below the acceleration value threshold. Furthermore, the processing device is configured to subtract the first time value from the second time value to determine an excess period of time which corresponds to the period of time during which the acceleration value was equal or higher than the acceleration value threshold.

In various embodiments, the processing device is configured to determine if an additional condition is met, namely if the excess period of time is equal to or longer than a time threshold. The processing device is furthermore configured to generate the warning signal only if the additional condition is met.

In various embodiments, the processing device is configured to start the timer if the acceleration value of the servo unit exceeds the acceleration value threshold and to reset the timer if the acceleration value of the servo unit falls below the acceleration value threshold prior to meeting the additional condition.

In various embodiments, the processing device is configured to determine a steering wheel angle and to determine if the steering system is within a predetermined end of travel range.

In various embodiments, the processing device is configured to determine if the velocity of the servo unit exceeds a velocity threshold. The processing device is configured to generate the warning signal if the velocity of the servo unit exceeds the velocity threshold before the acceleration value of the servo unit exceeds the acceleration value threshold.

In various embodiments, the processing device is configured to vary the velocity threshold as a function of the steering wheel angle.

In various embodiments, the processing device is configured to determine a risk of a damage level based on the determined acceleration value and to transmit the warning signal to an indication device.

Furthermore, a vehicle is provided that includes a damage risk indication system for a steering system of the vehicle. The damage risk indication system comprises a sensor system and a processing device. The sensor system is configured to detect a velocity of a servo unit of a steering system, and the processing device is configured to determine an acceleration value of the servo unit and to compare the acceleration value of the servo unit with an acceleration value threshold. The processing device is configured to generate a warning signal if the acceleration value of the servo unit exceeds the acceleration value threshold.

It is noted that in various embodiments, the vehicle and/or the damage risk indication system onboard the vehicle is modified in accordance with one or multiple embodiments of the damage risk indication system described herein, or in accordance with a combination of one or more of the embodiments of the damage risk indication system.

Furthermore, a method is provided for indicating a damage risk in a steering system of a vehicle. In various embodiments, the method includes the steps: detecting a velocity of a servo unit of the steering system of the vehicle, determining an acceleration value of the servo unit, comparing the acceleration value of the servo unit with an acceleration value threshold, generating a warning signal a warning signal if the acceleration value of the servo unit exceeds the acceleration value threshold.

In various embodiments, the method comprises the following steps: determining an excess period of time which corresponds to the period of time during which the acceleration value is equal to or higher than the acceleration value threshold, determining if an additional condition is met, namely that the excess period of time is equal to or longer than a time threshold, and generating the warning signal only if the additional condition is met.

It is noted that, in various embodiments, the method is modified in accordance with the functions of one or more of the embodiments or combinations of embodiments of the damage risk indication system described herein.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
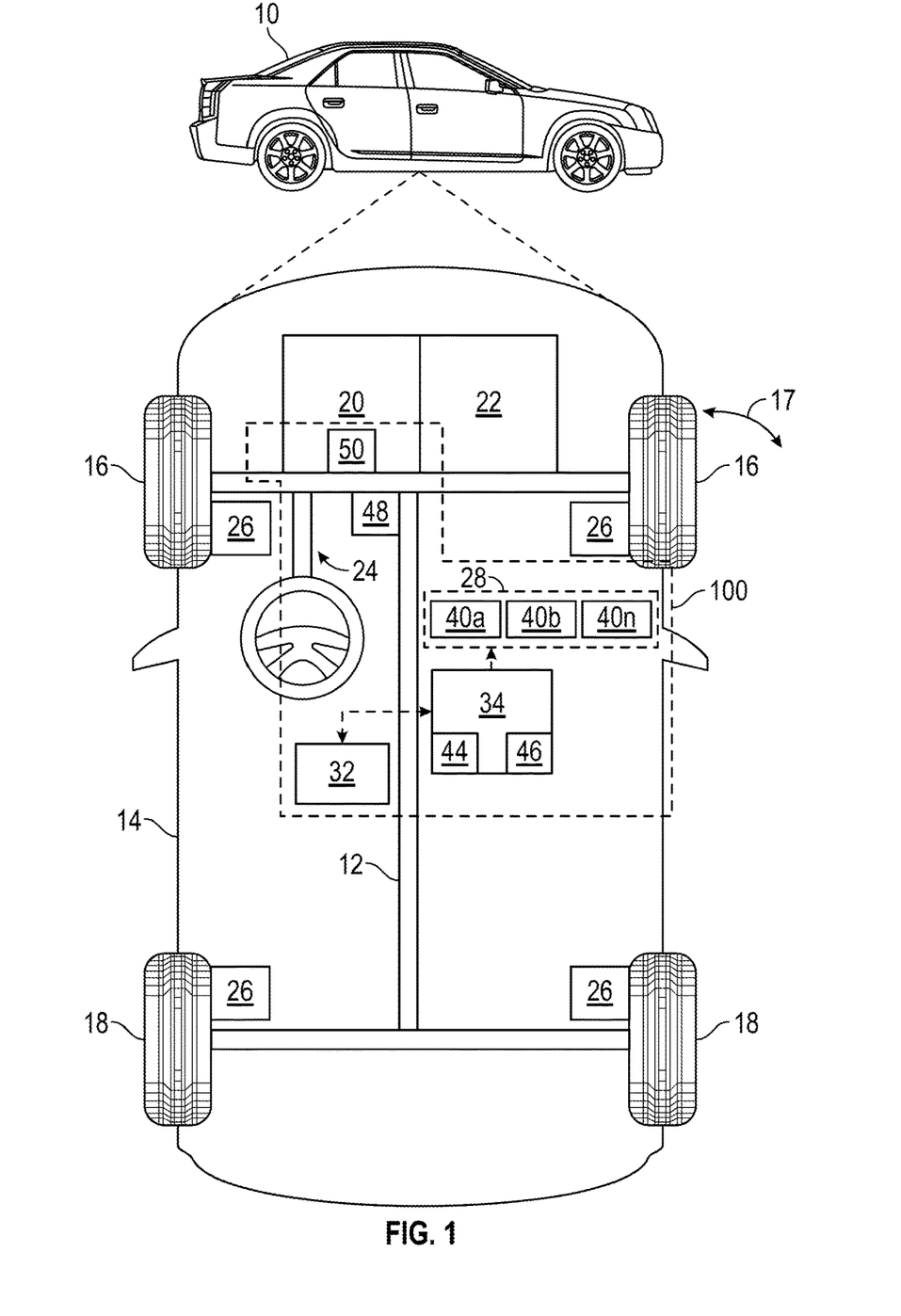
FIG. 1 is a functional block diagram illustrating a vehicle having a damage risk indication system for a steering system, in accordance with an embodiment.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle, a semi-autonomous vehicle, or a manually operated non-autonomous vehicle in accordance with one of the SAE levels. An autonomous vehicle 10 is, for example, a vehicle that is automatically controlled to carry passengers from one location to another. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, at least one data storage device 32, and at least one controller 34.

In various embodiments, the propulsion system 20 includes an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 includes a step-ratio automatic transmission, a continuously-variable transmission, or other appropriate transmission. The brake system 26 is configured to provide braking torque to the vehicle wheels 16 and 18. In various embodiments, the brake system 26 includes friction brakes, brake by wire, a regenerative braking system such as an electric machine, and/or other appropriate braking systems.

The steering system 24 influences a position and an angular orientation of the of the vehicle wheels 16 and 18. While depicted as including a steering wheel for illustrative purposes, in some embodiments contemplated within the scope of the present disclosure, the steering system 24 may not include a steering wheel. The steering system 24 includes a steering wheel 27, a steering axle, a steering rack, and a servo unit 50. The servo unit 50 is mechanically coupled with the steering rack so as to apply a force to the steering rack to support steering motions of the steering wheel 27. In various embodiments, the servo unit 50 is an electric motor.

The sensor system 28 includes one or more sensing devices 40a-40n that sense observable conditions of the exterior environment and/or the interior environment of the vehicle 10. In various embodiments and for an autonomous or semi-autonomous vehicle 10, the sensing devices 40a-40n include, but are not limited to, radars, yaw rate, lateral acceleration, road wheel speed, vehicle velocity, braking, deceleration, powertrain torques, driveline torques sensors, lidars, global positioning systems, optical cameras, thermal cameras, ultrasonic sensors, and/or other sensors. In various embodiments, the vehicle features can further include interior and/or exterior vehicle features such as, but are not limited to, doors, a trunk, and cabin features such as air, music, lighting, etc. (not numbered).

In various embodiments, the sensor system 28 includes a sensor (one of the sensing devices 40a-40n) which is assigned to the servo unit 50 and is configured to measure and/or determine a motion or rotational speed of a driving shaft (not shown) of the servo unit 50. In various embodiments, a sensor 40a of the sensor system 28 is positioned close to the servo unit 50 or even located within the same housing. In various embodiments, the sensor 40a determines the revolutions per time unit (revolutions per minute, rpm, or revolutions per second, rps, or the angular velocity of the driving shaft of the servo unit 50). When referring to the motion or velocity of the servo unit 50, it is understood that this relates to the revolutions of a driving shaft (not shown) of the servo unit 50. The servo unit 50 drives the rack gear 25 of the steering system 24 by the driving shaft and the revolutions of the driving shaft of the servo unit 50 are proportional to the lateral motion of the rack gear 25, i.e., to the angular displacement or deflection of the wheels 16 of the vehicle 10, typically of the front wheels 16.

Based on the determined motion of the servo unit 50 and under the assumption that the rack gear 25 of the steering system 24 is linearly coupled to the driving shaft of the servo unit 50, the processing device 44 of the controller 34 determines the motion of the rack gear 25 as a result of the determined motion of the driving shaft of servo unit 50. In various embodiments the coupling between rack gear and driving shaft is not linear and the coupling also has compliance. These data are used to determine an external impact on the wheels 16 assigned to the steering system 24, so that a risk of a damage to the steering system 24 resulting from the external impact is determined and indicated or displayed. This is described in more detail with reference to FIGS. 2 to 5.

The data storage device 32 receives and stores data from the sensor system 28 and provides these data to the controller 34 for further processing.

The controller 34 includes at least one processor 44 (which may also be referred to as processing device within the context of this description) and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34, particularly of the processor 44, are embodied to indicate a damage risk of a steering system 24 as described with reference to one or more of the embodiments herein. The controller 34 or one of its functional modules is configured to receive sensed information relating to the servo unit 50 of the steering system 24. Another or the same functional module of the controller 34 is configured to detect a velocity of the servo unit 50. Another or the same functional module of the controller 34 is configured to generate a signal for indicating the risk of a damage to the steering system 24 based on the sensed velocity of the servo unit 50.

In various embodiments, a damage risk indication system 100 for a steering system 24 of a vehicle 10 is provided. The damage risk indication system 100 comprises a sensor and a processing device 44. In various embodiments, the sensor is part of a sensor system 28 and is assigned to the damage risk indication system 100. The sensor system 28 is configured to detect a velocity of a servo unit 50 of a steering system 24 of the vehicle 10, and the processing device 24 is configured to determine an acceleration value of the servo unit 50 and to compare the acceleration value of the servo unit 50 with an acceleration value threshold 64. The velocity of the servo unit 50 can be inferred from external sensors such as steering arm sensors, yaw rate sensor, and rack position sensors. The processing device 44 is configured to generate a warning signal if the acceleration value of the servo unit 50 exceeds the acceleration value threshold 64.

The acceleration value of the servo unit 50 typically relates to the revolution speed changes of the driving shaft of the servo unit 50. In various embodiments, the servo unit 50 is an electric power steering (EPS) system and includes, but is not limited to, column EPS, rack EPS, and single pinion EPS or dual pinion EPS. As the servo unit 50 is mechanically coupled with the wheels 16, an external impact to the wheels 16 is directly transferred to the servo unit 50, and based on the acceleration value of the servo unit 50, conclusions can be drawn to the extent of the external impact, i.e., to possible damages to the steering system 24 resulting from the external impact.

The processor 44 is configured to determine the acceleration value of the servo unit 50 as a first derivative of the velocity of the driving shaft. However, in various embodiments, the sensor system 28 directly determines the acceleration of the servo unit 50.

In various embodiments, a rack force applied to the steering rack or gear rack 25 is determined by a sensor 40*a* in addition or alternatively to the acceleration value of the servo unit 50 and is used for determining the damage risk. In various embodiments, the rack force is additionally or alternatively determined by an estimation algorithm based on steering system signals like motor current and/or motor velocity, and/or vehicle level signals like lateral acceleration, road wheel angles, etc. However, as the servo unit 50 and the steering rack 25 are coupled with each other, a force applied to the steering rack 25 typically is transferred to the servo unit 50 such that the corresponding forces or accelerations are similar.

In various embodiments, the acceleration threshold value indicates possible damage to the steering system 24 or one of its components if exceeded. The acceleration threshold value is at least twice the acceleration value a human operator of a vehicle 10 is able to cause when manually operating, rotating or moving the steering wheel 27.

Thus, the damage risk indication system 100 does not determine if a damage actually occurred, but indicates if there is an (increased) likelihood or risk that a damage occurred based on the external impact on the steering system 24 or one of its components.

In various embodiments, the acceleration value threshold 64 covers both, positive and negative acceleration values.

In various embodiments, the processing device 44 of the damage risk indication system 100 is configured to repeatedly or iteratively detect the velocity of the servo unit 50.

In various embodiments, the processing device 44 comprises a timer which is configured to provide a time value. The processing device 44 is configured to read out a first time value of the timer if the acceleration value of the servo unit 50 exceeds the acceleration value threshold 64. The processing device 44 continues monitoring the acceleration and/or velocity of the servo unit 50 and to read out a second time value from the timer if the acceleration value of the servo unit 50 falls below the acceleration value threshold 64. Furthermore, the processing device 44 is configured to subtract the first time value from the second time value to determine an excess period of time which corresponds to the period of time during which the acceleration value was equal to or higher than the acceleration value threshold 64.

In various embodiments, the processing device 44 is configured to determine if an additional condition that the excess period of time is equal to or longer than a time threshold 66 is met. The processing device 44 is furthermore configured to generate the warning signal if the additional condition is met. The warning signal is generated if, and only if, the additional condition of exceeding a time threshold 66 is met.

In various embodiments, the processing device 44 is configured to start the timer if the acceleration value of the servo unit 50 exceeds the acceleration value threshold 64 and to reset the timer if the acceleration value 64 of the servo unit 50 falls below the acceleration value threshold 64 prior to meeting the additional condition. This embodiment relates to the specific case that the timer is started when the acceleration value 62 exceeds the threshold value 64. Furthermore, the timer is reset if the acceleration value 62 falls below the acceleration threshold 64 prior to exceeding the time threshold 66.

In various embodiments, the duration of the time span during which the acceleration value exceeds the acceleration value threshold is determined based on absolute time values (end time—start time) or the timer is started at zero if the acceleration value exceeds the acceleration value threshold and the duration is determined directly.

In various embodiments, the processing device 44 is configured to determine a steering wheel angle 54 and to determine if the steering system 24 is within a predetermined end of travel range 56. The steering wheel angle 54 may relate to a position of the steering wheel 27 and/or to a position of the steered wheels 16, typically the front wheels 16. Hence, a steering range or a travel range may be defined as a motion range of the steering system 24 between a leftmost point of the steered wheels 16 and a rightmost point of the steered wheels 16. In various embodiments, the steering range is defined by angular positions of the steered wheels 16 or by angular positions of the steering wheel 27, for example the leftmost end of travel point and the rightmost end of travel point of the wheels 16 or of the steering wheel 27.

Thus, a maximum travel range of the steered wheels 16 is defined. This maximum travel range is partitioned or segmented into three individual range sections. A first or leftmost end of travel range extends from the leftmost position (left stop) of the steered wheels 16 towards the center. A second or rightmost end of travel range extends from the rightmost position (right stop) of the steered wheels 16 towards the center. An intermediate travel range is located between the first and second end of travel ranges and may be referred to as being between end of travel (EoT).

For example, the maximum travel range of the steering system 24 is from −60° (leftmost point of the steered wheels with reference to a steering motion 17) to +60° (rightmost point of the steered wheels) and the first and second end of travel ranges may be between −60° and −45° on the one hand (leftmost end of travel range), and +45° to +60° on the other hand (rightmost end of travel range), while the range between the end of travel ranges extends between −45° to +45°. Of course, other angle values for the maximum travel range and the left and right end of travel ranges are also possible.

In various embodiments, the servo unit acceleration value threshold depends on and varies based on a current steering wheel angle. For example, if the steered wheels 16 are positioned within the first and second end of travel ranges, the acceleration value threshold is lower in comparison to being positioned between the end of travel ranges. Furthermore, even within the end of travel ranges, the acceleration value threshold may continuously, progressively, or degressively decrease when approaching the end of travel. For example, if the steered wheels 16 approach the end of travel, a lower external impact force may suffice to cause a similar damage as a higher external impact force if the wheels are between the end of travel ranges. Therefore, the acceleration value threshold decreases when approaching the end of travel in order to be more sensitive for a damage risk. For example, a damage may occur if the steered wheels 16 hit or strike the left or right stop mechanism of the steering system 24 as a result of the external impact.

In various embodiments, the processing device 44 is configured to determine if the velocity of the servo unit 50 exceeds a velocity threshold 52. The processing device 44 is configured to generate the warning signal if the velocity of the servo unit 50 exceeds the velocity threshold 52 before the acceleration value of the servo unit 50 exceeds the acceleration value threshold 64.

Thus, in this embodiment, the acceleration value (the first derivative of the velocity) as well as the velocity value (e.g., rotational speed of the driving shaft) are considered for determining a damage risk of the steering system 24.

In various embodiments, the processing device 44 is configured to vary the velocity threshold as a function of the steering wheel angle 54. The motor velocity threshold 52 is reduced if the steering wheel angle gets closer to the end of travel 56.

In various embodiments, the processing device 44 is configured to determine a damage level based on the determined acceleration value and to transmit the warning signal to an indication device 48. However, in various embodiments, other values (motor velocity 58, motor velocity threshold 52, steering wheel angle 54) are also considered for determining the possible damage level, i.e., the damage level risk.

Summing up, FIG. 1 shows a vehicle 10 that includes a damage risk indication system 100 for a steering system 24 in accordance with one or multiple of the embodiments described herein.

Figure 2:
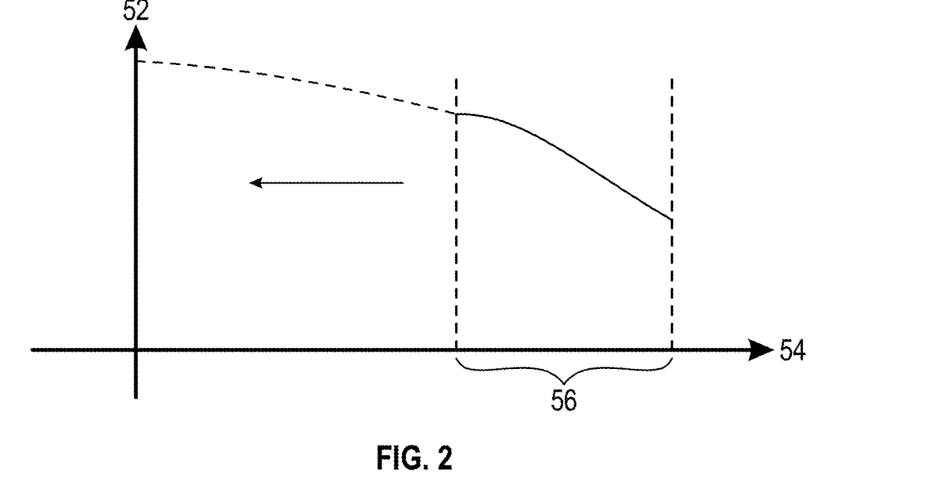
FIG. 2 schematically shows a diagram of the motor velocity threshold in relation to the steering wheel angle, in a damage risk indication system in accordance with an embodiment.

With reference now to FIG. 2, the diagram schematically shows the relation of the servo unit velocity threshold 52 (vertical axis) to the steering wheel angle 54 (horizontal axis). In various embodiments, the servo unit 50 (FIG. 1) comprises a motor (not shown) and the servo unit velocity threshold corresponds to the motor velocity threshold. The rightmost position of the steering wheel angle 54 is indicated by the right vertical dashed line. Range 56 from the left vertical dashed line to the right vertical dashed line indicates the end of travel range 56, for example the rightmost end of travel range of the steering system. Similar considerations also apply to the left side of the steering wheel angle range.

As can be seen in FIG. 2, the motor velocity threshold 52 decreases as the steering wheel angle 54 approaches the right stop mechanism. In various embodiments, this also applies to the acceleration value threshold.

The motor velocity threshold 52 shown in FIG. 2 for the rightmost end of travel range is mirrored for the leftmost end of travel range. Between these end of travel ranges, the motor velocity threshold 52 can be a constant value that is greater than the value indicated in FIG. 2 at the left vertical dashed line, and the motor velocity threshold 52 can also be a function of steering wheel angle, which increases towards the center, as indicated by the almost horizontal dashed line.

In various embodiments, the relationship between the motor velocity threshold 52 and the steering wheel angle 54 is implemented by the controller 34 of FIG. 1.

Figure 3:
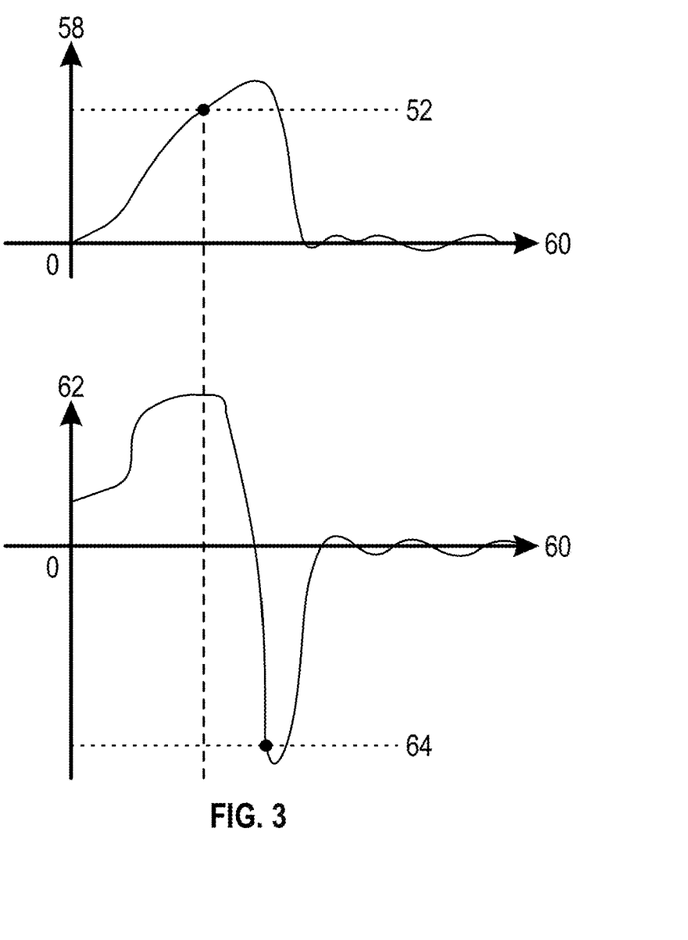
FIG. 3 schematically shows two diagrams, one with the motor velocity and one with the motor acceleration in relation to the time, in a damage risk indication system in accordance with an embodiment.

FIG. 3 schematically describes the relation of the motor velocity 58 to the time 60 (upper diagram), and the relation of the motor acceleration 62 to the time (lower diagram). Once the motor velocity 58 reaches a threshold value 52 (vertical dotted line) or exceeds that threshold value 52, monitoring of the motor velocity 58 is continued and monitoring of motor acceleration 62 is additionally started. If the monitored motor acceleration 62 exceeds a motor acceleration threshold value 64 (absolute value of the acceleration), a mechanical damage risk is indicated.

The diagram shown in FIG. 3 pertains to damage risk detection within the end of travel ranges 56 (left or right). In this case, exceeding the absolute acceleration threshold value 64 indicates that the steering system hits one of the stop mechanisms of the steering system 24 (FIG. 1), which may result in a damage. Thus, it is not only the velocity of the servo unit 50 (FIG. 1), but also the acceleration which is of relevance.

In various embodiments, the relationship between the motor velocity 58, motor velocity threshold 52, motor acceleration 62, motor acceleration value 64, and time 60 is implemented by the controller 34 of FIG. 1.

Figure 4:
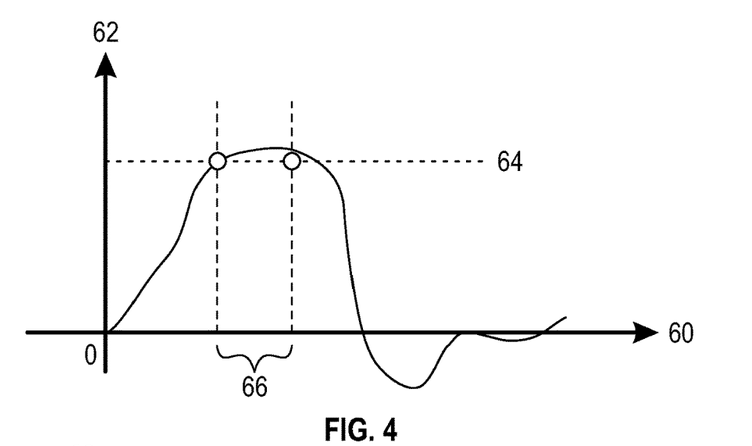
FIG. 4 schematically shows a diagram of motor acceleration in relation to the time, in a damage risk indication system in accordance with an embodiment.

FIG. 4 applies to the case that the steering wheel angle 54 is between end of travel ranges 56. Particularly, only the motor acceleration 62 is monitored and considered. The motor acceleration 62, however, may be determined as the first derivative of the motor velocity 58 (FIG. 3). Once the motor acceleration 62 is greater than a motor acceleration threshold 64, a timer is started to determine the duration of the time the motor acceleration is above the motor acceleration threshold 64. If the timer is greater than a motor acceleration time threshold 66, a mechanical damage risk is detected. In other words, the use case shown in FIG. 4 relates to the duration of the external impact. A damage risk is assumed if the duration exceeds the predetermined time threshold 66.

In various embodiments, the relationship between the motor acceleration 62, motor acceleration threshold 64, time 60, motor acceleration time threshold 66 is implemented by the controller 34 of FIG. 1.

Figure 5:
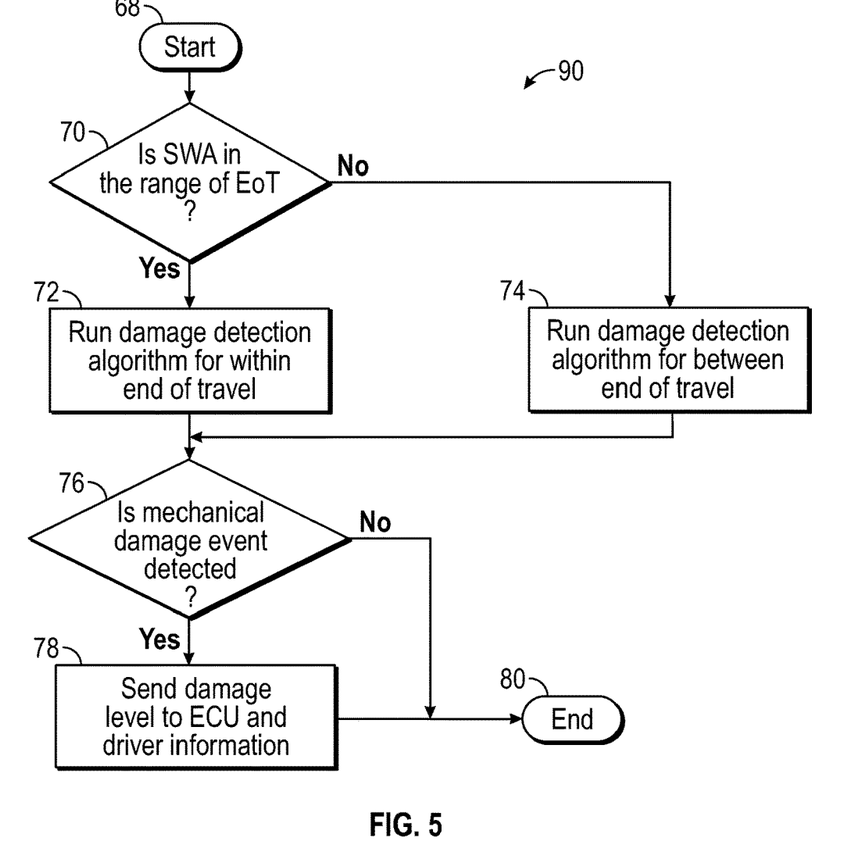
FIG. 5 schematically shows a flowchart of a detection algorithm, in a damage risk indication system in accordance with an embodiment.

With reference to FIG. 5, a flowchart is shown schematically indicating the steps of a method 90 for indicating a damage risk of a steering system 24 (FIG. 1). In an initial step, the detection algorithm is started 68, which typically happens with ignition of the propulsion system 20 (FIG. 1) of vehicle 10 (FIG. 1). Subsequently, the steering wheel angle 54 (FIG. 2) is detected in step 70, for example continuously and/or iteratively.

If the steering wheel angle 54 (FIG. 2) is within the end of travel range 56 (FIG. 2), the detection algorithm and determination steps of the damage risk indication system for within end of travel range 56 (FIG. 2) is executed in step 72 (FIG. 3). If the steering wheel angle 54 (FIG. 2) is between the end of travel ranges 56 (FIG. 2), the detection algorithm and determination steps of the damage risk indication system for between end of travel ranges is executed in step 74 (FIG. 4). Both steps 72, 74 provide a value which indicates a damage risk of the steering system 24 (FIG. 1). If, according to the determination steps 72 or 74, a mechanical damage risk is detected, a signal to the indication device 48 (FIG. 1) is transmitted. The method ends with the end of the detection algorithm 80.

In various embodiments, a method for indicating a damage risk in a steering system 24 (FIG. 1) of a vehicle 100 (FIG. 1) implements the flowchart shown in FIG. 5 and described with reference thereto, wherein the controller 34 of FIG. 1 implements the particular steps of flow chart 90. In various embodiments, the method includes the steps: detecting a velocity of a servo unit 50 (FIG. 1) of the steering system 24 (FIG. 1) of the vehicle 10 (FIG. 1), determining an acceleration value 62 (FIG. 3 and FIG. 4) of the servo unit 50 (FIG. 1), comparing the acceleration value 62 (FIG. 3 and FIG. 4) of the servo unit 50 (FIG. 1) with an acceleration value threshold 64 (FIG. 3 and FIG. 4), generating a warning signal if the acceleration value 62 (FIG. 3 and FIG. 4) of the servo unit 50 (FIG. 1) exceeds the acceleration value threshold 64 (FIG. 3 and FIG. 4).

In various embodiments, the method comprises the following steps: determining an excess period of time which corresponds to the period of time during which the acceleration value 62 (FIG. 3 and FIG. 4) is equal or higher than the acceleration value threshold 64 (FIG. 3 and FIG. 4), determining if an additional condition that the excess period of time is equal to or longer than a time threshold 66 (FIG. 4), and generating the warning signal only if the additional condition is met.

In various embodiments, the functional steps described with reference to FIG. 5 are implemented by a controller 34 shown in and described with reference to FIG. 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

LIST OF REFERENCE SIGNS 10 vehicle
12 chassis
14 body
16 front wheels
17 steering motion
18 rear wheels
20 propulsion system
22 transmission system
24 steering system
25 rack gear
26 brake system
27 steering wheel
28 sensor system
30 actuator system
32 data storage device
34 controller
40a, 40b, 40n sensing devices
44 processor, processing device
46 computer readable storage device or media
48 display device, indication device
50 drive unit, servo unit (servo-motor)
52 Motor Velocity Threshold (MVT)
54 Steering Wheel Angle (SWA)
56 End of Travel Range (EoT)
58 Motor Velocity, Motor Velocity Value
60 Time
62 Motor Acceleration, Motor Acceleration Value
64 Motor Acceleration Threshold (MAT)
66 Motor Acceleration Time-Threshold (MATT)
68 Start of Detection Algorithm
70 Detection of SWA
72 Detection Algorithm for within EoT
74 Detection Algorithm for between EoT
76 Detection of mechanical damage event
78 Sending Damage Level to display device
80 End of Detection Algorithm
90 Method for indicating a damage risk
100 Damage risk indication system

What is claimed is:

1. A damage risk indication system for a rack and pinion steering system of a vehicle, comprising:
    a sensor system,
    a processing device,
    wherein the sensor system is configured to detect a velocity of a servo unit associated with the rack of the steering system of the vehicle,
    wherein the processing device is configured to determine an acceleration value of the servo unit and to compare the acceleration value of the servo unit with an acceleration value threshold,
    wherein the processing device is configured to generate a warning signal when the acceleration value of the servo unit exceeds the acceleration value threshold.

2. The damage risk indication system of claim 1,
    wherein the processing device is configured to repeatedly detect the velocity of the servo unit.

3. The damage risk indication system of claim 1,
    wherein the processing device comprises a timer which is configured to provide a time value;
    wherein the processing device is configured to read out a first time value of the timer when the acceleration value of the servo unit exceeds the acceleration value threshold;
    wherein the processing device is configured to read out a second time value from the timer when the acceleration value of the servo unit falls below the acceleration value threshold;
    wherein the processing device is configured to subtract the first time value from the second time value to determine an excess period of time which corresponds to the period of time during which the acceleration value was equal or higher than the acceleration value threshold.

4. The damage risk indication system of claim 3,
    wherein the processing device is configured to determine when an additional condition that the excess period of time is equal to or longer than a time threshold is met;
    wherein the processing device is configured to generate the warning signal only when the additional condition is met.

5. The damage risk indication system of claim 4,
    wherein the processing device is configured to start the timer if the acceleration value of the servo unit exceeds the acceleration value threshold and to reset the timer when the acceleration value of the servo unit falls below the acceleration value threshold prior to meeting the additional condition.

6. The damage risk indication system of claim 1,
    wherein the processing device is configured to determine a steering wheel angle and to determine when the steering system is within a predetermined end of travel range.

7. The damage risk indication system of claim 6,
    wherein the processing device is configured to determine when the velocity of the servo unit exceeds a velocity threshold;
    wherein the processing device is configured to generate the warning signal when the velocity of the servo unit exceeds the velocity threshold before the acceleration value of the servo unit exceeds the acceleration value threshold.

8. The damage risk indication system of claim 7,
    wherein the processing device is configured to vary the velocity threshold as a function of the steering wheel angle.

9. The damage risk system of claim 1,
    wherein the processing device is configured to determine a risk of a damage level based on the determined acceleration value and to transmit the warning signal to an indication device.

10. A vehicle, comprising:
a rack and pinion steering system having a servo unit associated with a rack;
a sensor system; and
a processing device,
wherein the sensor system is configured to detect a velocity of the servo unit of the rack and pinion steering system of the vehicle,
wherein the processing device is configured to determine an acceleration value of the servo unit and to compare the acceleration value of the servo unit with an acceleration value threshold,
wherein the processing device is configured to generate a warning signal when the acceleration value of the servo unit exceeds the acceleration value threshold.

11. The vehicle of claim 10,
wherein the processing device is configured to repeatedly detect the velocity of the servo unit.

12. The vehicle of claim 10,
wherein the processing device comprises a timer which is configured to provide a time value;
wherein the processing device is configured to read out a first time value of the timer when the acceleration value of the servo unit exceeds the acceleration value threshold;
wherein the processing device is configured to read out a second time value from the timer when the acceleration value of the servo unit falls below the acceleration value threshold;
wherein the processing device is configured to subtract the first time value from the second time value to determine an excess period of time which corresponds to the period of time during which the acceleration value was equal or higher than the acceleration value threshold.

13. The vehicle of claim 12,
wherein the processing device is configured to determine when an additional condition that the excess period of time is equal to or longer than a time threshold;
wherein the processing device is configured to generate the warning signal only when the additional condition is met.

14. The vehicle of claim 13,
wherein the processing device is configured to start the timer when the acceleration value of the servo unit exceeds the acceleration value threshold and to reset the timer when the acceleration value of the servo unit falls below the acceleration value threshold prior to meeting the additional condition.

15. The vehicle of claim 10,
wherein the processing device is configured to determine a steering wheel angle and to determine when the steering system is within a predetermined end of travel range.

16. The vehicle of claim 15,
wherein the processing device is configured to determine when the velocity of the servo unit exceeds a velocity threshold;
wherein the processing device is configured to generate the warning signal when the velocity of the servo unit exceeds the velocity threshold before the acceleration value of the servo unit exceeds the acceleration value threshold.

17. The vehicle of claim 16,
wherein the processing device is configured to vary the velocity threshold as a function of the steering wheel angle.

18. The vehicle of claim 10,
wherein the processing device is configured to determine a damage level based on the determined acceleration value and to transmit the warning signal to an indication device.

19. A method for indicating a damage risk in a rack and pinion steering system of a vehicle, the method comprising:
detecting a velocity of a servo unit associated with a rack of the rack and pinion steering system of the vehicle,
determining an acceleration value of the servo unit,
comparing the acceleration value of the servo unit with an acceleration value threshold,
generating a warning signal a warning signal when the acceleration value of the servo unit exceeds the acceleration value threshold.

20. The method of claim 19, further comprising:
determining an excess period of time which corresponds to the period of time during which the acceleration value is equal to or higher than the acceleration value threshold,
determining when an additional condition that the excess period of time is equal to or longer than a time threshold is met,
generating the warning signal only when the additional condition is met.

* * * * *